(12) United States Patent
Bushmitch et al.

(10) Patent No.: US 7,046,733 B2
(45) Date of Patent: May 16, 2006

(54) DATA SEQUENCING METHOD TO IMPROVE TRANSMISSION OF SELF-SIMILAR DATA IN A MULTI-NODE NETWORK

(75) Inventors: Dennis Bushmitch, Somerset, NJ (US); Shivendra Panwar, Freehold, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 950 days.

(21) Appl. No.: 09/822,042

(22) Filed: Mar. 30, 2001

(65) Prior Publication Data

US 2002/0174443 A1    Nov. 21, 2002

(51) Int. Cl.
*H04N 7/12*    (2006.01)

(52) U.S. Cl. ............................. 375/240.26; 375/240.27

(58) Field of Classification Search ........... 375/240.26, 375/240.27; 709/224, 226, 246, 247; 370/230.1, 370/232, 235
See application file for complete search history.

(56) References Cited

U.S. PATENT DOCUMENTS 5,583,792 A * 12/1996 Li et al. ...................... 709/224
6,862,622 B1 * 3/2005 Jorgensen ................... 709/226

OTHER PUBLICATIONS

Beran et al, "Long-Range Dependence in Variable Bit Rate Video Traffic", IEEE Transactions on Communications, vol. 43, No. 2/3/4, pp. 1566-1579. Feb./Mar./Apr. 1995.*
Leland et al, "On the Self-Similar Nature of Ethernet Traffic (Extended Version)", IEEE/ACM Transactions on Networking, vol. 2, No. 1, pp. 1-15, Feb. 1994.*
A. Erramilli et al., Experimental Queueing Analysis with Long-Range Dependent Packet Traffic, IEEE/ACM Transaction on Networking, vol. 4, No. 2, Apr. 1996.
W. Willinger et al., Self-Similarity and Heavy Tails: Structural Modeling of Network Traffic, 1998.

* cited by examiner

*Primary Examiner*—Vu Le
(74) *Attorney, Agent, or Firm*—RatnerPrestia

(57) ABSTRACT

The present invention is a data formatting method for data in a digital communication network. The first step in the method is to identify a predetermined number of blocks in the data stream, each block including several data values. The blocks are shuffled by skipping a number of blocks of the input data between consecutive blocks of transmitted data and periodically resetting the skip pointer to transmit the skipped blocks as a part of a later skip operation. The shuffled blocks are then transmitted through the network and reordered again at the other side to recreate the original data stream. Others blocks are similarly reordered and transmitted. The shuffling of the blocks of data reduces self-similarity in the data while maintaining local order.

12 Claims, 7 Drawing Sheets

DATA SEQUENCING METHOD TO IMPROVE TRANSMISSION OF SELF-SIMILAR DATA IN A MULTI-NODE NETWORK

BACKGROUND OF THE INVENTION

The present invention concerns sequencing of data in a multi-node communications network, in particular a data sequencing method to improve transmission of self-similar data through the network and reduce buffer expenditures within the network.

Broadband local area network (LAN) traffic, bursty variable bit-rate (VBR) video traffic and wide-area network (WAN) traffic, such as on the Internet, have been shown to have self-similar, fractal, properties. Self-similar traffic behaves very differently than voice traffic or traffic predicted by packet traffic models, which typically conform to Poisson-like distributions. In a Poisson-like packet traffic model, aggregate traffic become smoother (i.e. less prone to bursts of data) as the number of traffic sources increases. The self-similar nature of LAN and VBR video traffic, on the other hand, cause such traffic to manifest a self-similar burstiness at every time scale. Bursts, consisting of bursty sub-periods separated by less bursty sub-periods, are seen in the traffic on a millisecond time scale, as well as on an hour time scale. This self-similar, fractal, pattern imparts a long-range dependence (LRD) in the traffic. The burstiness of the composite of such traffic tends to increase, rather than decrease, as the number of traffic sources increase.

Self-similar burstiness may lead to a reduction in network performance. Transmission nodes within the network can only handle a certain data rate, which is often exceeded at the height of a burst, leading to congestion and data loss. One solution is to reduce the amount data travelling through the network, thus decreasing the overflow frequency of bursts. This is not a desirable solution, however, as it results in the underutilization of network resources. Merely increasing the buffer size in the network may not relieve the problem as the burstiness of the data exhibits itself on several time scales. Greater buffer size may, however, increase the delay for traffic passing through the network.

Networks that may be affected by long range dependency include broadband ISDN networks and Internet networks. This effect of long-range dependency is discussed in an article by W. Leland et al. entitled "On the Self-Similar Nature of Ethernet Traffic," *Proc. ACMSigcomm* '93, San Francisco, 1993, pp. 183–193 and in an article by A. Erramili et al. entitled "Experimental Queuing Analysis with Long-Range Dependent Packet Traffic," *IEEE/ACM Transactions on Networking* vol. 4, no. 2, 1996.

One solution for handling data that exhibits long range dependency is to incorporate a queuing buffer at the source node to store excess data during bursts for later transmission during intervening lower traffic periods, effectively smoothing the data bursts. This method is presently in use, especially for VBR video data. As data comes into a transmission node, it enters the back of the queuing buffer. Meanwhile, the oldest data in the queuing buffer is taken off of the front of the buffer at a predetermined rate and transmitted. The remaining data in the buffer is moved forward. This system smoothes the data traffic across transmission nodes and allows the network to operate at is a high efficiency if the full bandwidth of the network can be filled with similar fixed-bandwidth components. The amount of data waiting in the buffer fluctuates with the incoming traffic level, absorbing the burstiness of the stream. To effectively handle LRD data (i.e. maintaining a low cell loss rate), the smoothing buffer must be large. Larger buffers, however, cause increased delay that may not be acceptable for some applications.

SUMMARY OF THE INVENTION

The present invention is embodied in a scheduling method for data in a digital communication network that improves transmission by breaking up self-similarities in the data while preserving local order. The scheduling method reorders individual blocks of data in a macro-block while preserving the order of the data in each block. An exemplary embodiment of this method contains several steps. The first step is to define the data in terms of macro-blocks, each macro-block including a plurality of blocks. The blocks of a macro-block are reordered to substantially reduce the self-similarity of the data in the macro-block. The reordered blocks are then transmitted through the network, and reordered again at the other side to recreate the macro-block.

According to one aspect of the invention, a digital communications network includes a shuffling buffer at an input node to shuffle blocks of the data and thereby substantially reduce self-similarity in the data. It also includes at least one transmission node through which the shuffled data is sent, and a reconstruction buffer at a client node to reconstruct the shuffled data into its original order.

DETAILED DESCRIPTION OF THE INVENTION

One exemplary embodiment of the present invention uses shuffling techniques to aid the flow of traffic through a computer network. An exemplary deterministic shuffling is to introduce skips of a certain number of blocks of data to be transmitted through the network. For example, one may reorder nine blocks, originally sequentially numbered 1–9, with skips of three segments: 1, 4, 7, 2, 5, 8, 3, 6, 9. In this example, the nine blocks form a macro-block. Once a certain number of skips are made, in this example two, the order jumps back to the first remaining block. This number is known as the restart number. Though simple, a shuffling of this sort substantially reduces the long-range dependency, and, if the skips are large enough, can substantially eliminate LRD behavior, at least up to a certain time range. After one macro-block has been transmitted, the same procedure is applied to the remaining macro-blocks until all of the data in the data stream has been transmitted. Although the exemplary embodiment of the invention is described in terms of a block-shuffling algorithm that uses skips and restarts, it is contemplated that it may be practiced with many different data resequencing operations that change the order of blocks of data according to a predetermined deterministic scheme.

The present invention is described in terms of blocks of macro-blocks. A macro-block may be as large as the entire data set and a block may be as small as a single frame. Each block includes multiple data values and the order of the data in each blocks is maintained even when the blocks are reordered. While the invention is described in terms of reordering blocks in macro-blocks, it is contemplated that, in addition, the macro-blocks themselves may be reordered.

Figure 1A:
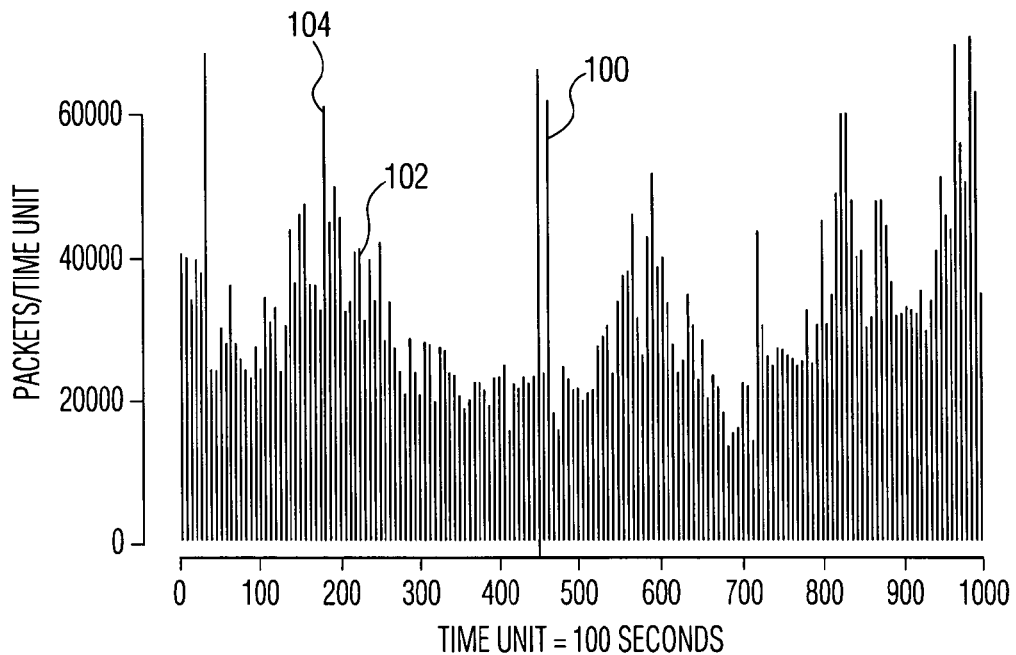
FIGS. 1a, 1b, 1c, 1d, and 1e are graphs illustrating self-similarity of data traffic in a digital communication network.
Figure 1B:
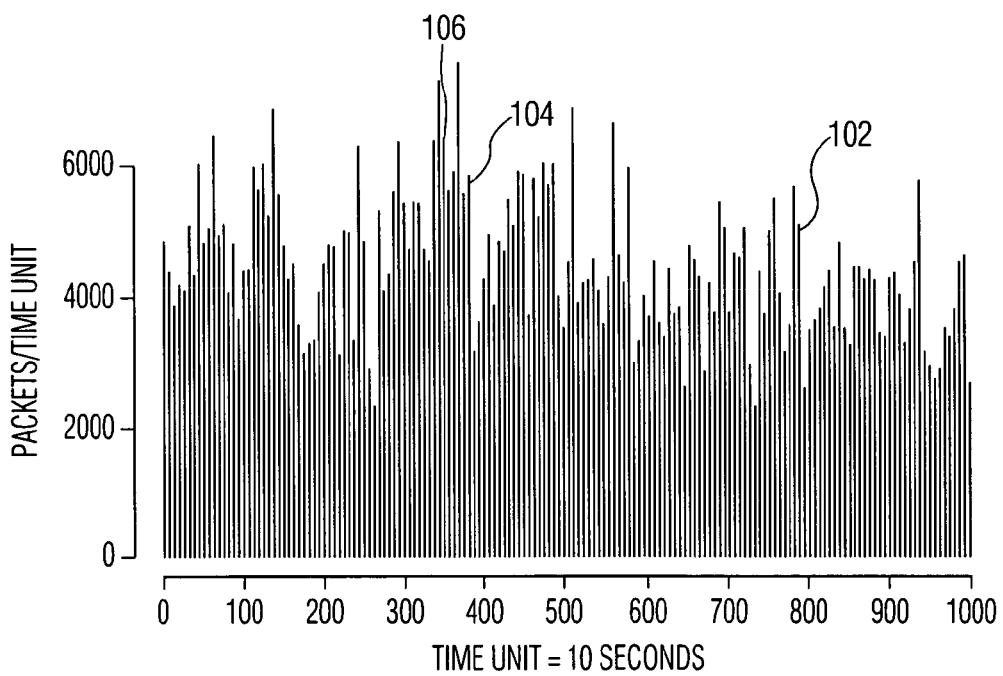
Figure 1C:
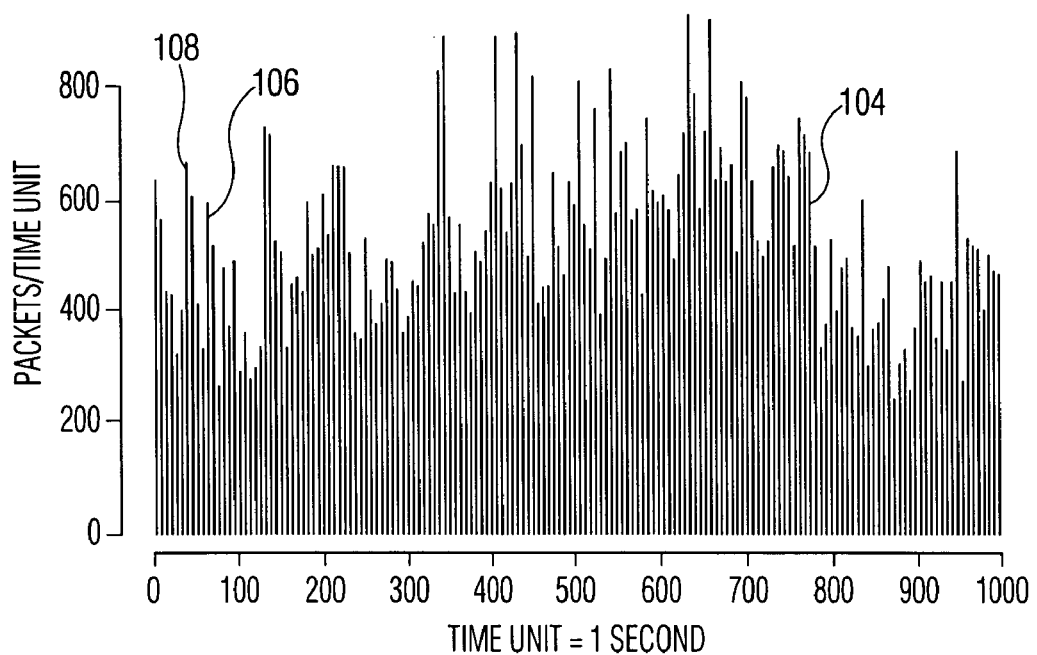
Figure 1D:
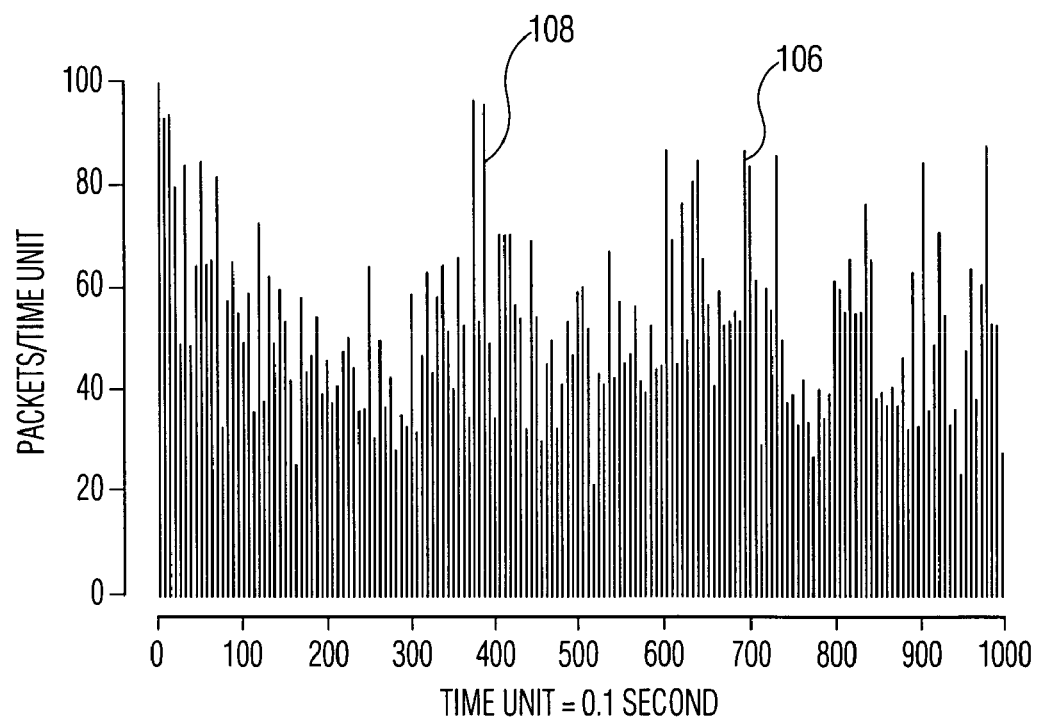
Figure 1E:
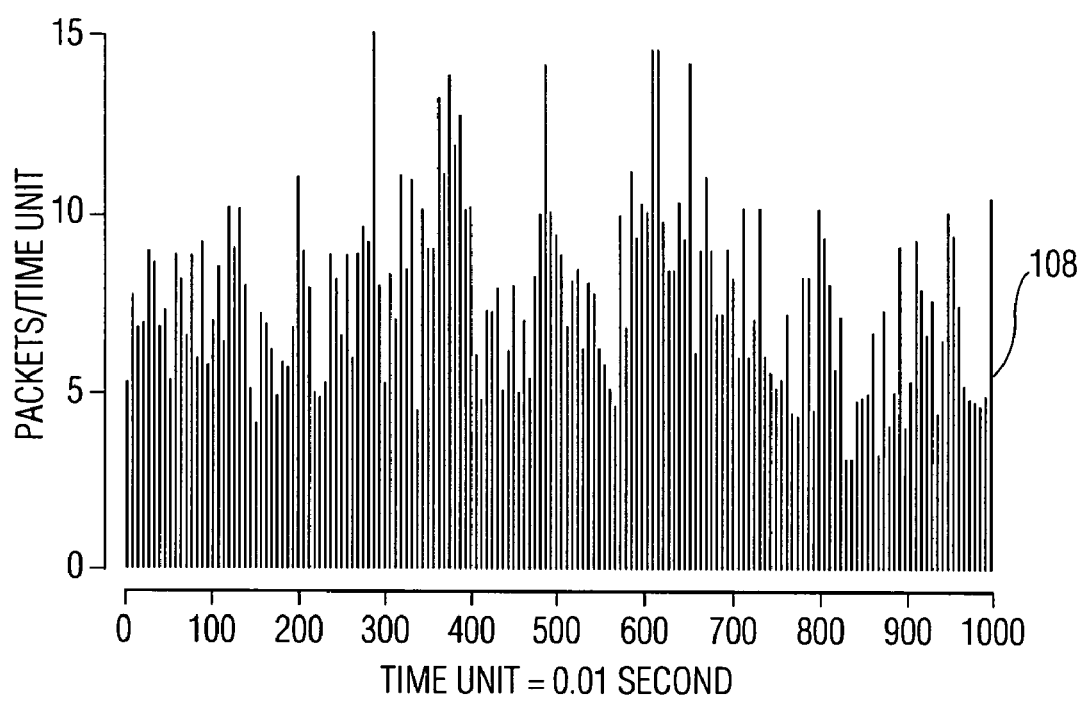

FIG. 1a–e show exemplary traffic levels through a node of digital communications network transmitting LAN data. The graph in FIG. 1a contains time series 100, which shows the number of packets transmitted per 100 second interval. Also highlighted in FIG. 1a are time series 102, a randomly selected tenth of time series 100, and time series 104, a randomly selected tenth of time series 102. Each of graphs in FIG. 1b–e contain progressively more finely resolved portions of the time series in the preceding graph(s). An important feature of these graphs is the similar levels of burstiness shown over all of these time scales. This is an example of the self-similarity seen in LAN and VBR data.

Figure 2A:
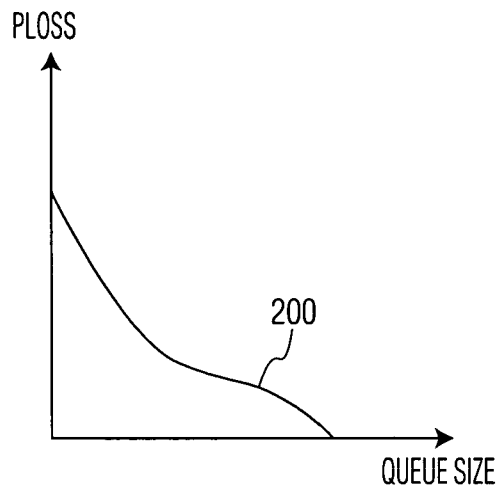
FIG. 2a is a semi-log graph illustrating a heavy tail characteristic of self-similar data traffic.
Figure 2B:
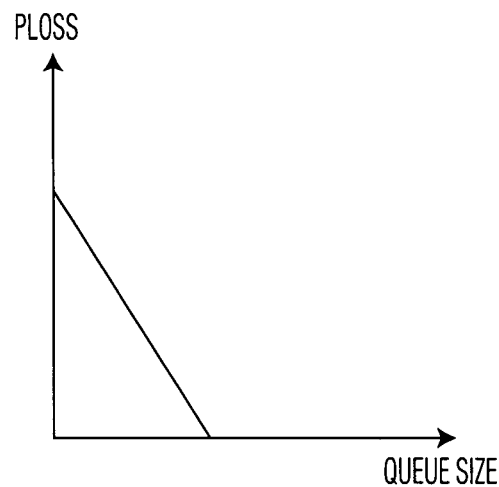
FIG. 2b is a semi-log graph illustrating Poisson-like data traffic.

FIGS. 2a and b are semi-log graphs of illustrating the logarithm of the overflow frequency of a queuing buffer versus the buffer size for an exemplary level of traffic in the network. FIG. 2a represents the overflow frequency for self-similar traffic, which exhibits long-range dependencies. Heavy tail 200 is indicated, showing that, for LRD data, there is only a small improvement in loss rate when the buffer size is increased, at least over a certain range of buffer size values. FIG. 2b represents the overflow frequency of Poisson-like, or random, traffic flow.

Figure 3:
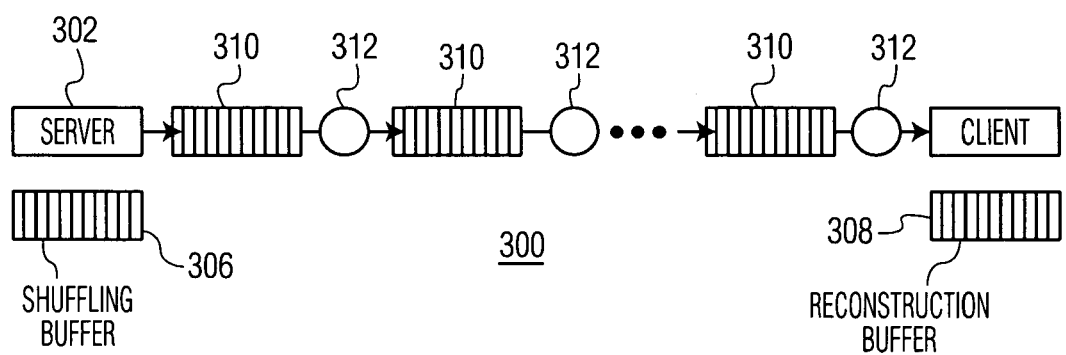
FIG. 3 is a block diagram of an exemplary multi-node digital communication network of the present invention.

FIG. 3 shows an exemplary digital communications network 300 of the present invention. Data traffic from server 302 enters shuffling buffer 306 where blocks of data are deterministically reordered. The reordered blocks of data are then transmitted through queuing buffers 310 of node(s) 312 of the digital communications network and reordered again by reconstruction buffer 308 to reconstruct the original data. Client 304 may then receive the data which they desire from the traffic. The subject invention deterministically reorders blocks of data in a macro-block to preserve local order (i.e. the order of the data in each block) and, thus, avoid a complete randomization of the data. Randomization of bursty data may not be beneficial if the random reordering clusters high-data rate intervals. To understand how this may occur, consider the transmission of a VBR video stream that has been encoded according to the standard specified by the Moving Pictures Experts Group (MPEG). This video stream includes intra-frame coded images (I-frames), predictively encoded images (P-frames) and bidirectionally encoded images (B-frames). I-frames typically include more data than P-frames which typically include more data than B-frames. If the block unit is chosen to be an image frame, and the macro-block unit a predetermined number of frames (e.g. 1024 frames), then a random reordering of the frames may group I-frames next to each other, resulting in a burst of data that is too large for the network buffers to handle. Data in one of the I-frames would then be lost, severely degrading the video image reproduced from the reordered frames. The terms "block" and "macro-block" as used in the present invention are not to be confused with the terms of the same name used in the MPEG standard.

In addition to the advantage of reduced overflow frequency in the exemplary multi-node digital communications network of the present invention shown in FIG. 3, such a network may have the advantage of reduced memory use. In a multi-node digital communications network relying only on queuing buffers to smooth traffic, there is a queuing buffer 310 at each transit node 312, with a large memory, $Q_0$. In the exemplary multi-node digital communications network of the present invention shown in FIG. 3, there is a shuffling buffer, with memory, $S_{mem}$, and a reconstruction buffer, with memory, $R_{mem}$ but, because the reshuffling operation has reduced long-range dependency in the data, each of the network nodes uses a smaller amount of memory, $Q_1$, in the queuing buffer. Equation (1) shows the net memory saved, M, for the exemplary multi-node digital communications network of the present invention shown in FIG. 3 with N nodes.

$$M=(Q_0-Q_1)*N-(S_{mem}+R_{mem}) \qquad (1)$$

For a particular data transmission, it may be better to consider the net delay through a network having H+1 hops, that is to say the transmission passes through H transit nodes in its path from the input end-node to the output end-node. In a multi-node digital communications network relying on queuing buffers to smooth traffic, there is a buffer delay at each node, $Q_t$. If LRD data is transmitted through the network, the delay is $Q_{0t}$. If the data is preprocessed to reduce LRD, the delay is $Q_{1t}$. In the exemplary multi-node digital communications network of the present invention shown in FIG. 3, there is a shuffling buffer delay, $S_t$, and a reconstruction buffer delay, $R_t$. Equation (2) shows the time saved, T, for transmission of data through the exemplary multi-node digital communications network of the present invention shown in FIG. 3 where the data passes through H transit nodes.

$$T=(Q_{t0}-Q_{t1})*H-(S_t+R_t) \qquad (2)$$

Figure 4:
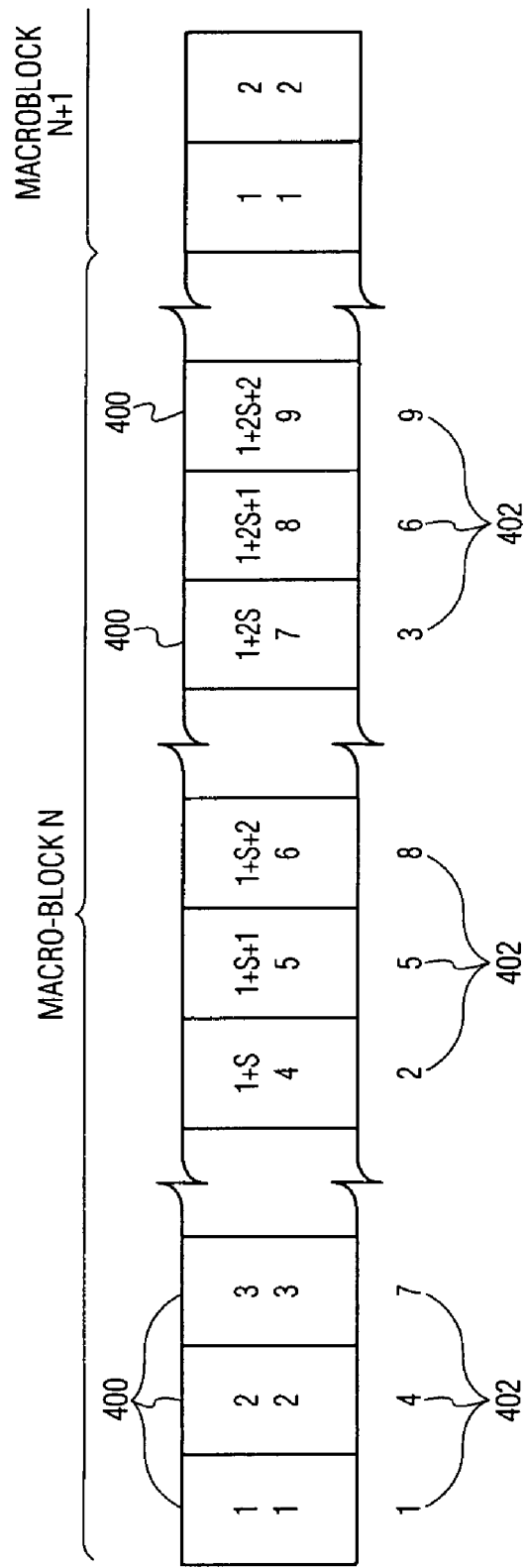
FIG. 4 is a drawing illustrating an exemplary shuffling of sub-blocks according to the present invention.

FIG. 4 illustrates data traffic being reordered in a shuffling buffer by an exemplary method, discussed above to create a shuffled time series, using skips of S blocks and a restart number of R. The exemplary block numbers 400 in the lower part of the blocks and the order numbers 402 illustrate the case where S=3 and R=2. Thus, the exemplary shuffling algorithm sends a block, skips three blocks to send the next block, skips three blocks again to send the next block and then restarts at the block next to the first block that was sent.

Thus, the skip number, S, refers to the number of blocks that are skipped between successive transmissions and the reset number, R, refers to the number of skips after which the position of the transmission is reset to the block next to the block that was sent at the beginning of the last skip cycle. As an example, the block numbers 400 in FIG. 4 are the order in which the original blocks were received and order number 402 is the order in which the shuffled blocks are transmitted through the network using this exemplary shuffling technique to reorder the data.

Thus, the number of blocks, $N_{MB}$ in a macro-block that is used in a shuffling scheme having a skip number S and a restart number R, is given by equation (3).

$$N_{MB}=S(R+1) \qquad (3)$$

Figure 5:
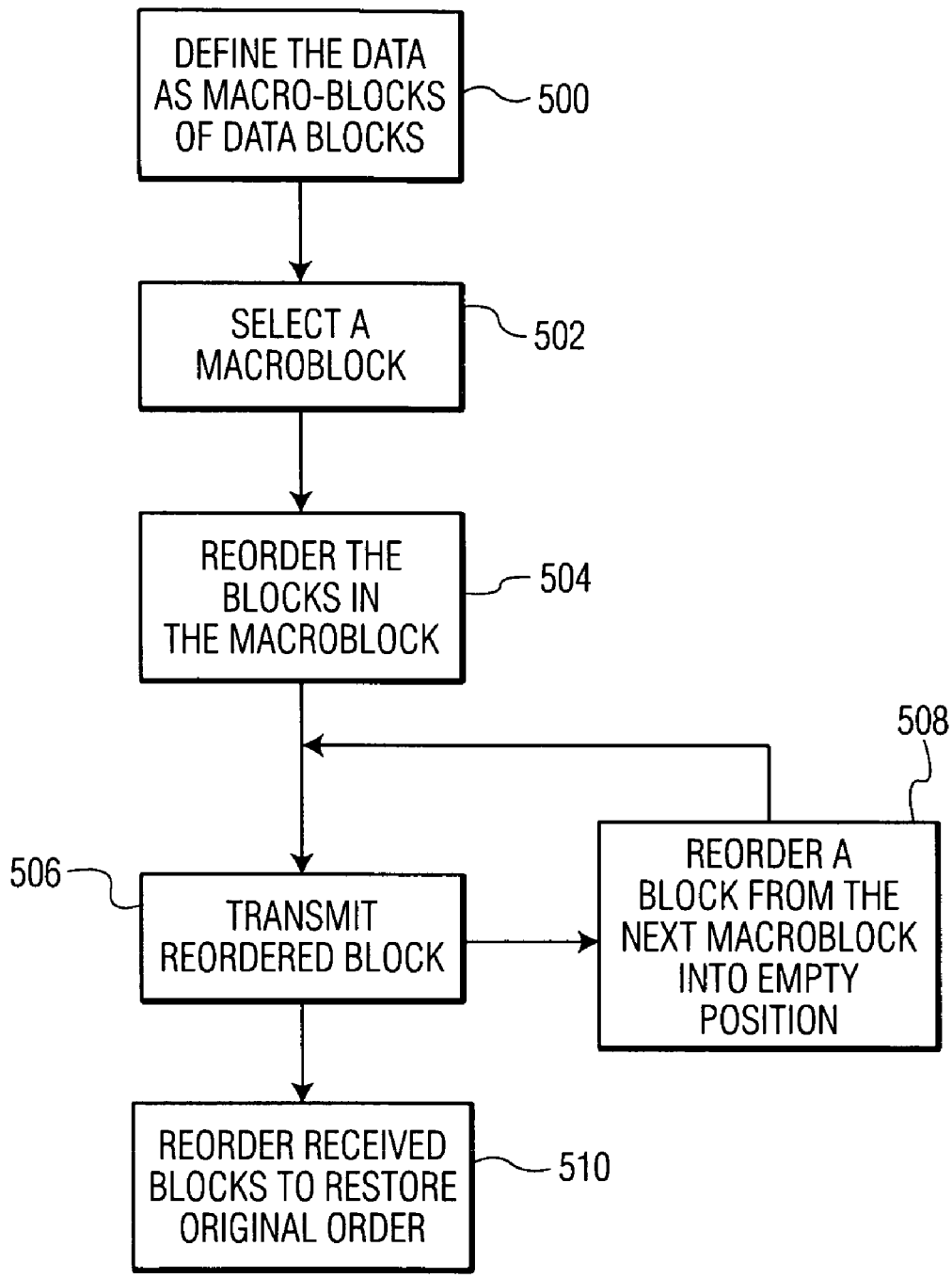
FIG. 5 is a flowchart illustrating an exemplary method of the present invention.

FIG. 5 is a flowchart of an exemplary method of the present invention to remove long-range dependencies and thereby decrease overflow frequency in a digital communications network. The method begins with step 500, by defining the data as macro-blocks of data blocks. For a VBR MPEG video sequence, for example, the blocks may be picture records and the macro-blocks may be groups of 1024 picture records.

Next, step 502 selects a first macro-block and, at step 504 the blocks in this macro-block are deterministically reordered. In the exemplary embodiment, the MPEG video picture records are shuffled with a skip number of 32 and a restart number of 32. The degree to which the long-range dependence, and other deterministic characteristics, of the data are eliminated depends both upon the shuffling method selected and the parameters of that shuffling method.

An exemplary embodiment of the present invention uses the method of skips and restarts for creation of reordered data sets, as described above with reference to FIG. 4. Although the example shows the use of skips of three segments (blocks) and restarting at the next value after two skips, larger numbers of the skipped segments (skip numbers) and larger restart numbers to produce greater reductions in the long-range dependency of the original data traffic. Larger skip numbers and larger restart numbers, however, also increase the size of the shuffling and reconstruction buffers. The effectiveness of this exemplary shuffling method for creating data sequences with reduced LRD also depends on the block size, which may affect the complexity of the shuffling circuitry.

The three steps, 500, 502, and 504, represent an initial delay in transmitting a data stream. In one exemplary embodiment of the invention, an entire macro-block is resequenced and stored in the shuffling buffer before transmission begins. In another embodiment, only a portion of the macro-block may be stored into the reshuffling buffer before transmission begins, with the remainder of the macro-block being shuffled and stored as the earlier shuffled blocks are transmitted. In a third embodiment of the invention, the shuffling buffer may not perform any shuffling operation but, instead, may be indexed using the skip and restart values to dynamically reorder the blocks.

In one exemplary embodiment of the invention, where the data to be transmitted is a VBR MPEG bit-stream, the step 500 may search the bit-stream for picture headers and store the data associated with each picture header into a separate cell of the reshuffling buffer. To accommodate I-frames as well as P-frames and B-frames, each cell holds an amount of data that is at least equal to the largest amount of data that may be generated for an I-frame.

As each block of data from the shuffling buffer is transmitted in step 506, a corresponding block from the next macro-block is reordered and inserted in place of the data that was just transmitted at step 508. This exemplary method overlaps the reordering of the data in the next macro-block with the transmission of data from the current macro-block. After step 508, control transfers to step 506 to transmit the next block. Because the shuffling of each macro-block after the first macro-block overlaps the transmission of the first macro-block it does not represent any additional delay for the system.

When the reordered blocks are transmitted in step 506, they pass through at least one node 310 of the network 300. Once the reordered blocks have been received at the destination node, they are reordered again by the reconstruction buffer to recreate the original data traffic, step 510. As with steps 500, 502 and 504, the reordering of the data in a macro-block may overlap the receipt of the data. Alternatively, the data may be stored directly into a reshuffling buffer using, for example, skip and restart numbers that are transmitted with the data, so that the blocks of data may be stored directly into their final positions in the macro-block as they are received at the receiving end-node.

Figure 6:
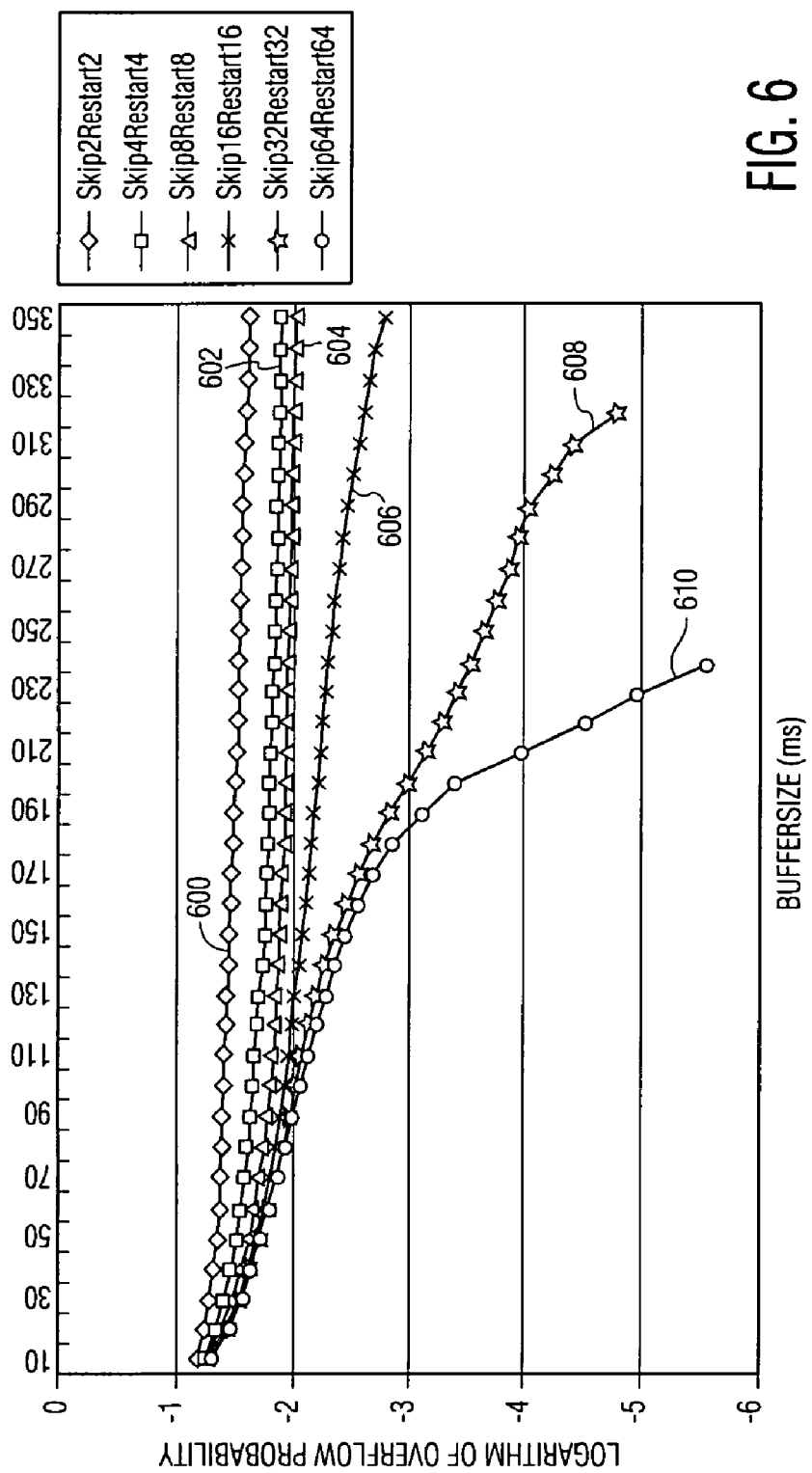
FIG. 6 is a semi-log graph showing the results of experiments carried out by the inventors of an exemplary shuffling method.

FIG. 6 is a semi-log graph showing the results of experiments carried out by the inventors using the exemplary shuffling method of skips and restarts previously described with regard to FIG. 4. All of the curves show the logarithm of the overflow frequency as a function of the queuing buffer size in an exemplary digital communications network for VBR video data. The block size chosen was 300 ms. Curve 600 illustrates exemplary data for a reordering of the VBR video data with a skip number of 2 and a restart number of 2. The skip number fan restart numbers for the remaining curves, 602, 604, 606, 607, and 610, are shown in the table.

TABLE

| Curve # | Skip # | Restart # |
|---------|--------|-----------|
| 602 | 4 | 4 |
| 604 | 8 | 8 |
| 606 | 16 | 16 |
| 608 | 32 | 32 |
| 610 | 64 | 64 |

Although the blocks shown in the Table are defined in terms of an amount of displayed video time represented by each block, it is contemplated that other measures may be used to form blocks of data. Each block may, for example, be a predetermined number of bytes. If the embodiment is used with a VBR video stream, each block may represent a respectively different amount of video display time.

Although the embodiments of the invention description above have been in terms of a multi-node digital communication network, it is contemplated that similar concepts may be practiced within other networks. Additionally, it is contemplated that the functions of the shuffling and reconstruction buffers previously described may be carried out within a general purpose computer system instructed to perform these functions by means of a computer-readable carrier. Such computer-readable carriers include, for example, magnetic and optical storage media, as well as audio-frequency, radio frequency, and optical carrier waves. Also, it will be understood to one skilled in the art that a number of other modifications exist which do not deviate from the scope of the present invention as defined by the appended claims.

What is claimed:

1. A method for transmitting a data stream that exhibits self-similarity through a digital communication network, the method comprising the steps of:
    (a) receiving a plurality of blocks in the data stream, each block including a plurality of data values;
    (b) reordering the blocks according to a predetermined deterministic scheme to reduce the self-similarity of the data stream, wherein the predetermined deterministic scheme reorders a predetermined number of blocks, $N_{MB}$ corresponding to a macro-block, the predetermined number being defined as $N_{MB}=S(R+1)$ where S is an integer skip number defining a number of input blocks that are skipped between successive blocks of the reordered data starting from block D in the macro-block and R is an integer restart number defining a number of skip operations to be performed before restarting the skip operations from block D+1 in the macro-block, where D is an integer;
    (c) transmitting the reordered blocks through the digital communications network to a receiving node; and
    (d) reordering the blocks again, at the receiving node, to reverse the predetermined deterministic scheme and regenerate the data stream.

2. A method according to claim 1, wherein S is equal to R.

3. A method according to claim 1, wherein S and R are greater than 32.

4. A method according to claim 1, wherein:
    the data stream is an variable bit rate (VBR) video stream including a plurality of picture records;
    step (b) includes the steps of:
        identifying the picture records in the VBR video stream; and
        reordering the picture records according to the predetermined deterministic scheme; and
    step (d) includes the steps of
        identifying the picture records in the reordered VBR video stream; and
        reordering the picture records again to reverse the predetermined deterministic scheme and regenerate the VBR video stream.

5. A method for transmitting a data stream that exhibits self-similarity through a digital communication network, the method comprising the steps of:
    (a) receiving a plurality of blocks in the data stream, wherein the blocks of data are grouped in macro-blocks, each block including a plurality of data values;
    (b) reordering the blocks in each macro-block, individually, according to a predetermined deterministic scheme to reduce the self-similarity of the data stream;
    (c) transmitting the reordered blocks through the digital communications network to a receiving node; and
    (d) reordering the blocks again, at the receiving node, to reverse the predetermined deterministic scheme and regenerate the data stream.

6. A method according to claim 5, further including the step of reordering the macro-blocks prior to applying the predetermined deterministic scheme to a macro-block and wherein the step of reordering the blocks at the receiving node further includes the step of reordering the macro-blocks.

7. A data transmission interface for a digital communications network which transmits data from an input node to an output node, a portion of the data exhibiting self-similarity, comprising:
    means for receiving blocks of data to be transmitted through the network, each block including a plurality of data values;
    a shuffling buffer which reorders blocks of the received data according to a predetermined deterministic scheme reduce the self-similarity of the data and to provide the reordered blocks of data to the input node of the network; and
    a reconstruction buffer, coupled to receive the reordered data from the output node of the digital communications network, the reconstruction buffer reordering the data to reverse the predetermined deterministic scheme and reconstruct the received data;
    wherein;
    the shuffling buffer includes;
    a skip register which holds an integer skip value, S and
    a restart register which holds an integer restart value, R; and
    the predetermined deterministic scheme reorders a predetermined number of blocks, $N_{MB}$ corresponding to a macro-block, the predetermined number being defined as $N_{MB}=S(R+1)$ where S is an integer skip number defining a number of input blocks that are skipped between successive blocks of the reordered data starting from block D in the macro-block and R is an integer restart number defining a number of skip operations to be performed before restarting the skip operations from block D+1 in the macro-block, where D is an integer.

8. A data transmission interface for a digital communications network which transmits data from an input node to an output node, a portion of the data exhibiting self-similarity, comprising:
    means for receiving blocks of data to be transmitted through the network, each block including a plurality of data values;
    a shuffling buffer which reorders blocks of the received data according to a predetermined deterministic scheme reduce the self-similarity of the data and to provide the reordered blocks of data to the input node of the network;
    a reconstruction buffer, coupled to receive the reordered data from the output node of the digital communications network, the reconstruction buffer reordering the data to reverse the predetermined deterministic scheme and reconstruct the received data; and
    a plurality of transmission nodes in the data communications network, each transmission node having a queuing buffer, wherein each queuing buffer has a predetermined memory size sufficient only to queue data that does not exhibit self-similarity through the network.

9. A data transmission interface method which configures data exhibiting self-similarity for transmission through a digital communications network from an input node to an output node of the network, the method comprising the steps of:
    receiving blocks of data to be transmitted through the network, each block including a plurality of data values;

reordering the received blocks data according to a predetermined deterministic scheme reduce the self-similarity of the data, wherein the blocks of data are grouped in macro-blocks and the predetermined deterministic scheme is applied to all of the blocks in each macro-block individually;

providing the reordered blocks of data to the input node of the network; and retrieving the reordered blocks of data from the output node of the network; and reordering the data to reverse the predetermined deterministic scheme and reconstruct the received data.

10. A method according to claim 9, further including the step of reordering the macro-blocks prior to applying the predetermined deterministic scheme to each macro-block and wherein the step of reordering the blocks to reverse the predetermined deterministic scheme further includes the step of reordering the macro-blocks.

11. A computer readable carrier including computer program instructions adapted to instruct a general purpose computer to implement a method that substantially reduces self-similarity of data using a scheduling method, the method comprising the steps of:

(a) receiving a plurality of blocks of data grouped in macro-blocks, each block having a predetermined block size; and (b) reordering the blocks of data in each individual macro-block according to a predetermined deterministic scheme to substantially reduce the self-similarity of the blocks of data.

12. A computer readable carrier according to claim 11, further including the step of reordering the macro-blocks according to the predetermined deterministic scheme prior to reordering the blocks of data in each individual macro-block.

* * * * *